(12) United States Patent
Wei et al.

(10) Patent No.: US 12,277,082 B2
(45) Date of Patent: Apr. 15, 2025

(54) DEVICES, HOST DEVICE AND NON-TRANSITORY COMPUTER READABLE STORAGE MEDIUM

(71) Applicant: HTC Corporation, Taoyuan (TW)

(72) Inventors: Chang-Hua Wei, Taoyuan (TW); Sheng-Cherng Lin, Taoyuan (TW); Pei-Pin Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 805 days.

(21) Appl. No.: 17/444,995

(22) Filed: Aug. 13, 2021

(65) Prior Publication Data

US 2022/0058148 A1 Feb. 24, 2022

Related U.S. Application Data

(60) Provisional application No. 63/068,382, filed on Aug. 21, 2020.

(51) Int. Cl.
  *G06F 13/38* (2006.01)
  *G06F 9/4401* (2018.01)
  *G06F 13/10* (2006.01)

(52) U.S. Cl.
  CPC .......... *G06F 13/385* (2013.01); *G06F 9/4411* (2013.01); *G06F 13/102* (2013.01)

(58) Field of Classification Search
  None
  See application file for complete search history.

(56) References Cited

U.S. PATENT DOCUMENTS

| | | | |
|---|---|---|---|
| 7,865,629 B1 * | 1/2011 | Tantos | G06F 13/4068 710/11 |
| 8,996,771 B1 * | 3/2015 | Lockwood | G06F 13/385 710/106 |
| 10,743,165 B1 | 8/2020 | Patel et al. | |

(Continued)

FOREIGN PATENT DOCUMENTS

| CN | 102111696 A | 6/2011 |
|---|---|---|
| CN | 104703113 A | 6/2015 |

(Continued)

OTHER PUBLICATIONS

Corresponding European extended search report issued on Jan. 17, 2022.

(Continued)

*Primary Examiner* — Tuan S Nguyen
(74) *Attorney, Agent, or Firm* — CKC & Partners Co., LLC

(57) ABSTRACT

A management method for multiple communication devices, wherein the multiple communication devices include a host device and a first peripheral device configured to electrically connect to a device platform, and the management method includes: by the host device, detecting a connection of the first peripheral device through the device platform; by the host device, receiving a first device identifier provided by the first peripheral device through the device platform; by the host device, storing the first device identifier in the host device; and by the host device, wirelessly pairing the host device with the first peripheral device, according to the first device identifier stored in the host device, to enable a first wireless communication between the host device and the first peripheral device.

18 Claims, 10 Drawing Sheets

(56) References Cited

U.S. PATENT DOCUMENTS

| | | | | |
|---|---|---|---|---|
| 2008/0285626 | A1* | 11/2008 | Claus | H04W 12/06 |
| | | | | 375/E1.033 |
| 2008/0320190 | A1* | 12/2008 | Lydon | H04W 12/50 |
| | | | | 710/106 |
| 2011/0028167 | A1 | 2/2011 | Cryderman et al. | |
| 2014/0365694 | A1* | 12/2014 | Bolton | H04W 80/02 |
| | | | | 710/106 |
| 2017/0256970 | A1 | 9/2017 | Ciesinski et al. | |
| 2020/0162883 | A1* | 5/2020 | Dickmann | H04W 4/80 |

FOREIGN PATENT DOCUMENTS

| | | | | |
|---|---|---|---|---|
| CN | 104835304 | A | 8/2015 | |
| CN | 105208515 | A | 12/2015 | |
| CN | 106028264 | A | 10/2016 | |
| CN | 107046674 | A | 8/2017 | |
| CN | 107360633 | A | 11/2017 | |
| CN | 107769820 | A | 3/2018 | |
| CN | 109254648 | A | 1/2019 | |
| CN | 109600694 | A | 4/2019 | |
| CN | 109842872 | A | 6/2019 | |
| CN | 109905869 | A | 6/2019 | |
| CN | 110011824 | A | 7/2019 | |
| CN | 110891261 | A | 3/2020 | |
| EP | 2282604 | A1 | 2/2011 | |
| JP | 2011087574 | A | 5/2011 | |
| KR | 101804884 | B1 | 12/2017 | |
| TW | 200411394 | A | 7/2004 | |
| WO | 2009002786 | A2 | 12/2008 | |
| WO | WO-2020147342 | A1 * | 7/2020 | H04L 5/0053 |

OTHER PUBLICATIONS

The office action of the corresponding Chinese application No. CN202110929846.3 issued on Mar. 25, 2024.

The office action of the corresponding Chinese application No. 202110929846.3 issued on Sep. 5, 2023.

* cited by examiner

DEVICES, HOST DEVICE AND NON-TRANSITORY COMPUTER READABLE STORAGE MEDIUM

CROSS-REFERENCE TO RELATED APPLICATION

This application claims priority to U.S. Provisional Application Ser. No. 63/068,382, filed on Aug. 21, 2020, which is herein incorporated by reference.

BACKGROUND

Field of Invention

This disclosure relates to a management method for multiple communication devices, and in particular to a management method for multiple communication devices including a host device and at least one peripheral device.

Description of Related Art

Currently, multiple communication devices can be placed in the storage equipment (e.g., multiple devices charge shelf). It is understanding that some communication devices (e.g., HMD (head-mounted device) and hand-held controllers for the VR (virtual reality) environment) should be grouped together for pairing. However, it is easy for one set of communication devices to get mixed up with another set when multiple sets of communication devices are all placed in the storage equipment. This situation often confuses the user, and therefore requires the user to validate each communication device in one set before the operation for one set of communication devices. The validation also hinders each user to get his/her own set of communication devices. For the students in classroom where the time usage is limited, spending 10 minutes on finding their own set of communication devices means 10 minutes less of learning.

SUMMARY

An aspect of present disclosure relates to a management method for multiple communication devices, wherein the multiple communication devices include a host device and a first peripheral device configured to electrically connect to a device platform, and the management method includes: by the host device, detecting a connection of the first peripheral device through the device platform; by the host device, receiving a first device identifier provided by the first peripheral device through the device platform; by the host device, storing the first device identifier in the host device; and by the host device, wirelessly pairing the host device with the first peripheral device, according to the first device identifier stored in the host device, to enable a first wireless communication between the host device and the first peripheral device.

Another aspect of present disclosure relates to a host device configured to be electrically connected to a device platform, and includes a memory, a communication circuit and a processor coupled to the memory and the communication circuit. The processor is configured to: detect a connection of a first peripheral device to the device platform through the device platform; receive a first device identifier provided by the first peripheral device through the device platform; store the first device identifier in the memory; and wirelessly pair the host device with the first peripheral device through the communication circuit, according to the first device identifier stored in the memory, to enable a first wireless communication between the host device and the first peripheral device.

Another aspect of present disclosure relates to a non-transitory computer readable storage medium with a computer program to execute a management method for multiple communication devices, wherein the multiple communication devices include a host device and a first peripheral device configured to electrically connect to a device platform, and the management method includes: by the host device, detecting a connection of the first peripheral device through the device platform; by the host device, receiving a first device identifier provided by the first peripheral device through the device platform; by the host device, storing the first device identifier in the host device; and by the host device, wirelessly pairing the host device with the first peripheral device, according to the first device identifier stored in the host device, to enable a first wireless communication between the host device and the first peripheral device.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
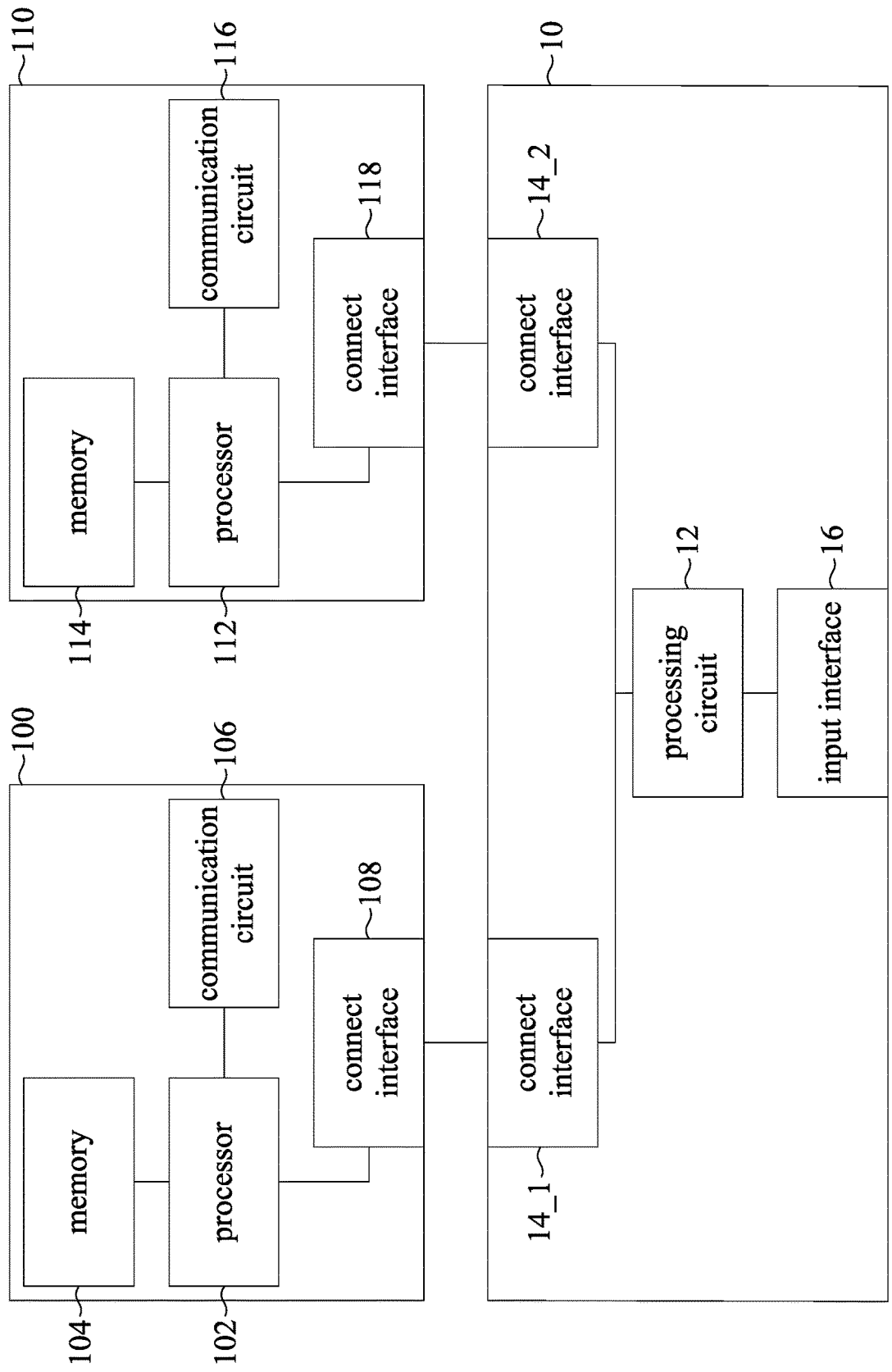
FIG. 1 is a blocking diagram of the host device, the peripheral device and the device platform in accordance with some embodiments of the present disclosure.

Referring to FIG. 1, FIG. 1 depicts a host device 100, a peripheral device 110 and a device platform 10 in accordance with some embodiments of the present disclosure. The host device 100 and the peripheral device 110 are configured to electrically connect to the device platform 10. When the host device 100 and the peripheral device 110 are electrically connected to the device platform 10, the host device 100 and the peripheral device 110 can be charged through the device platform 10. For example, a power supplying source (e.g., a power adaptor) configured to generate the electric power can be coupled to the device platform 10 through electric wires or be integrated in the device platform 10, so as to provide the electric power to the host device 100 and the peripheral device 110 through the device platform 10. Furthermore, the host device 100 can selectively and wirelessly (i.e., not through the device platform 10) pair with the peripheral device 110 by performing the management method 200 (which would be described in detail below with reference to FIGS. 2A-2C), so as to selectively enable the wireless communication between the host device 100 and the peripheral device 110.

In structure, the host device 100 includes a processor 102, a memory 104, a communication circuit 106 and a connect interface 108. The processor 102 is coupled to the memory 104, the communication circuit 106 and the connect interface 108. The peripheral device 110 includes the processor 112, the memory 114, the communication circuit 116 and the connect interface 118. The processor 112 is coupled to the memory 114, the communication circuit 116 and the connect interface 118. The device platform 10 includes the processing circuit 12, the connect interface 14_1, the connect interface 14_2 and the input interface 16. The processing circuit 12 is configured to electrically connect to the connect interface 14_1, the connect interface 14_2 and the input interface 16 respectively.

It can be appreciated that FIG. 1 only shows one host device 100, one peripheral device 110 and one device platform 10 for simplifying description. The number of the host device 100, the number of the peripheral device 110 and the number of the device platform 10 are not limited thereto. In some embodiments, the number of the connect interface 14_1 and the number of the connect interface 14_2 of the device platform 10 for electrically connecting the host device 100 and the peripheral device 110 can be greater than which is shown in FIG. 1 (e.g., greater than 1), so as to electrically connect to multiple peripheral devices 110.

As shown in FIG. 1, the host device 100 can be electrically connected to the device platform 10 by coupling the connect interface 108 to the connect interface 14_1. Also, the peripheral device 110 can be electrically connected to the device platform 10 by coupling the connect interface 118 to the connect interface 14_2. In some embodiments, the connect interface 108, the connect interface 118, the connect interface 14_1 and the connect interface 14_2 each are implemented by physical interfaces, such as universal serial bus (USB) type-C port or other power supply connectors capable of data communication. In other embodiments, the connect interface 108, the connect interface 118, the connect interface 14_1 and the connect interface 14_2 each are implemented by wireless communication, such as near field communication (NFC), Bluetooth and ZigBee, and by wireless charging technology. In other words, the connect interface 108 is coupled to the connect interface 14_1 by wireless or wired means, and the connect interface 118 is coupled to the connect interface 14_2 by wireless or wired means.

In some embodiments, the communication circuit 106 and the communication circuit 116 are implemented by wireless communication technology, such as near field communication (NFC), Bluetooth and ZigBee. The memory 114 of the peripheral device 110 can store a unique device identifier (e.g., Bluetooth ID) representing the identity of the peripheral device 110. The processor 102 of the host device 100 can receive the device identifier provided by the peripheral device 110 through the device platform 10 and can store the received device identifier in the memory 104 of the host device 100. In such way, the communication circuit 106 and the communication circuit 116 can wirelessly pair the host device 100 and the peripheral device 110 according to the device identifier stored in the memory 104. For example, the peripheral device 110 may broadcast packets including the device identifier thereof, and the host device 100 may response to the broadcast packets by transmitting a connection request to the peripheral device 110 if the device identifier in the broadcast packets matches the device identifier stored in the host device 100. Then, after the peripheral device 110 responses to the connection request, the host device 100 and the peripheral device 110 are paired to establish a wireless communication (e.g., a Bluetooth communication) between the host device 100 and the peripheral device 110.

In some embodiments, the input interface 16 of the device platform 10 is configured to receive the user input (not shown). The processing circuit 12 is configured to generate the control signal (not shown) when the input interface 16 receives the user input. The control signal would be transmitted to the processor 102 of the host device 100 through the connection between the connect interface 108 and the connect interface 14_1. Also, the control signal would be transmitted to the processor 112 of the peripheral device 110 through the connection between the connect interface 118 and the connect interface 14_2. In such way, the processor 102 of the host device 100 and the processor 112 of the peripheral device 110 are configured to perform the related operations (which would be described in detail below) in response to the received control signal.

In other embodiments, the input interface 16 is omitted from the device platform 10. In such arrangement, the host device 100 and the peripheral device 110 would perform the related operations if at least one peripheral device is newly connected to the device platform 10 to which the host device 100 has been already connected.

Figure 2A:
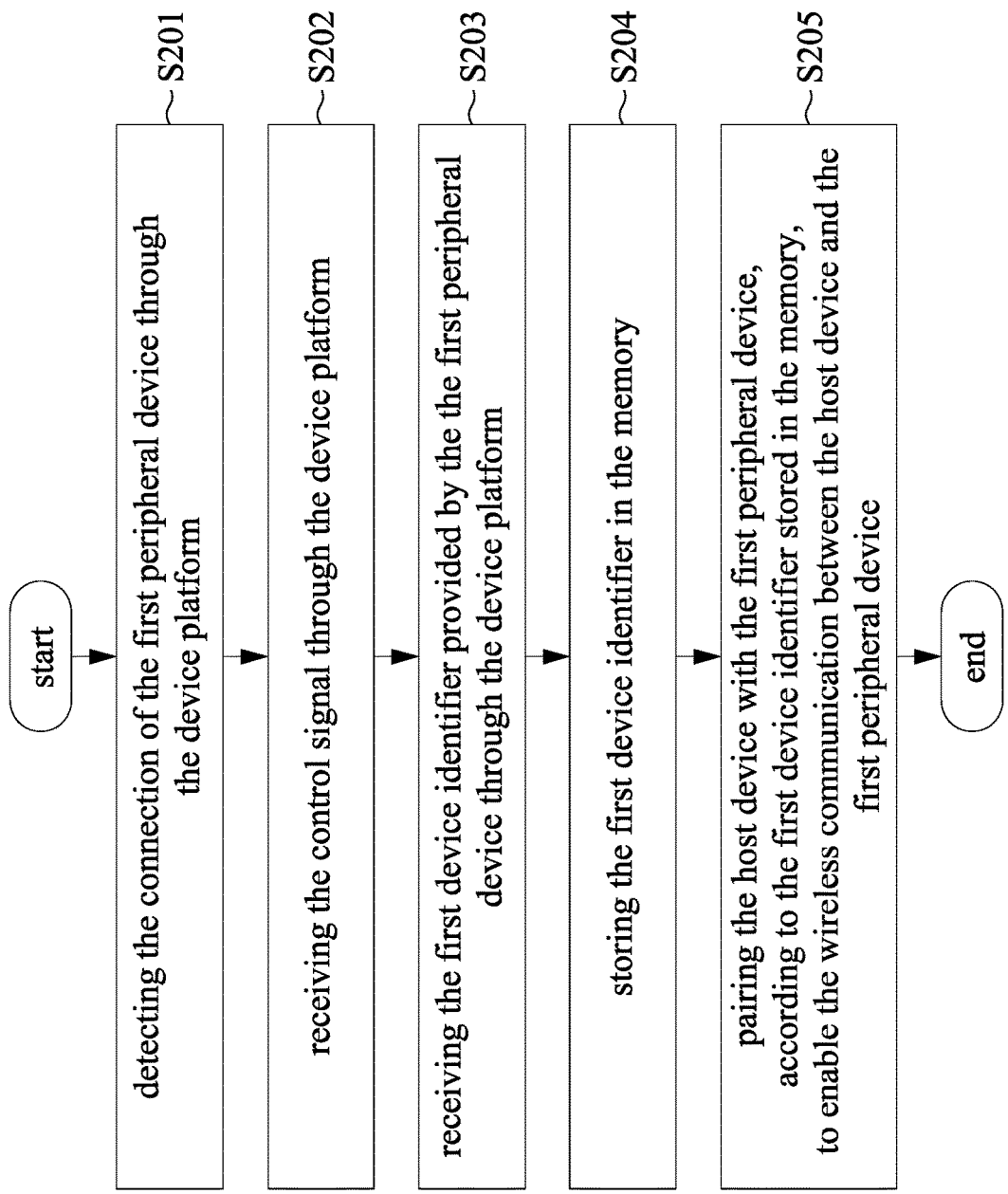
FIGS. 2A-2C are flow diagrams of the management method for multiple communication devices in accordance with some embodiments of the present disclosure.
Figure 2B:
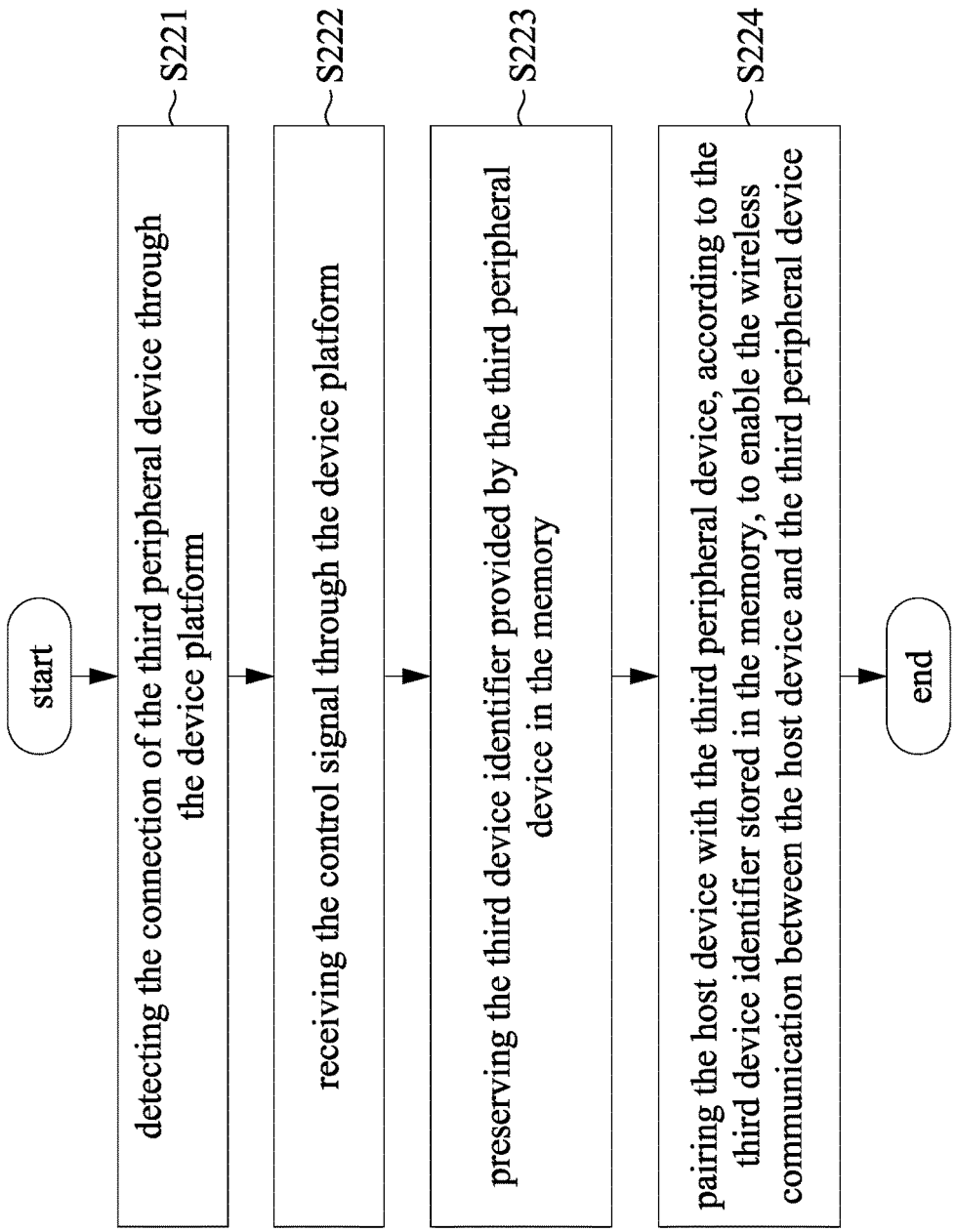
Figure 2C:
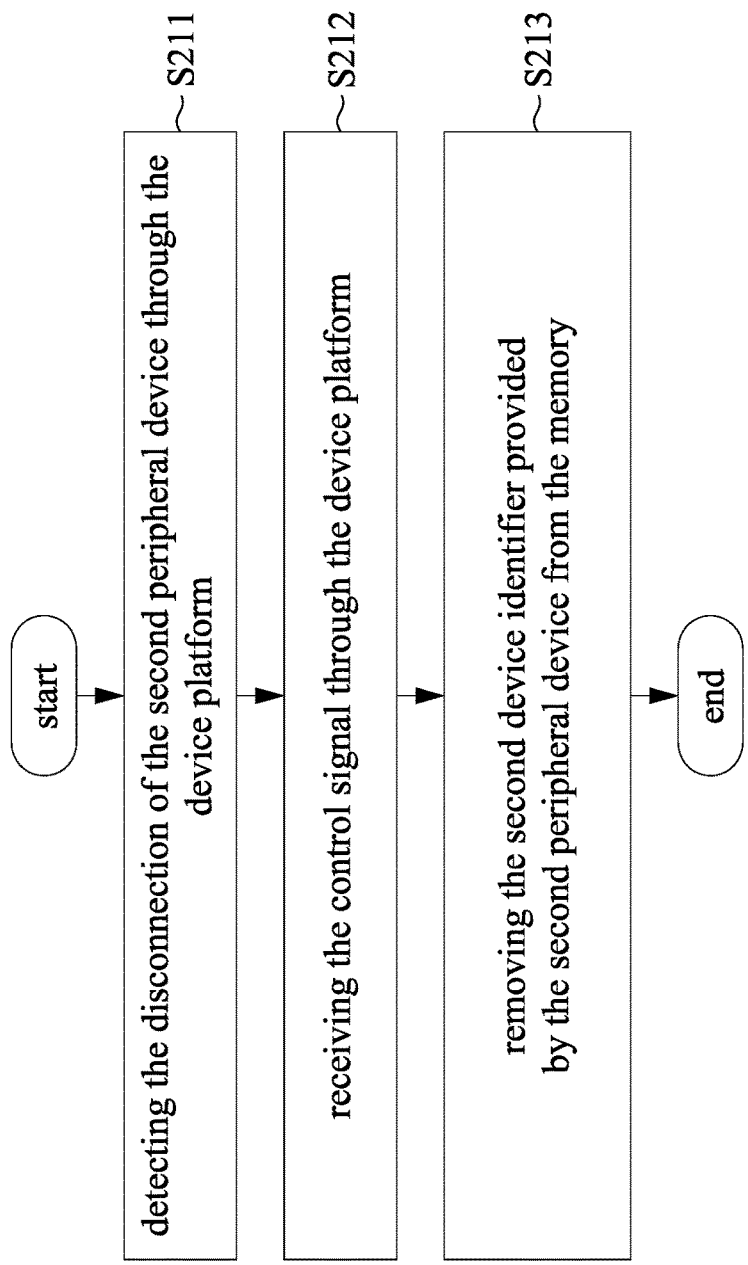
Figure 3A:
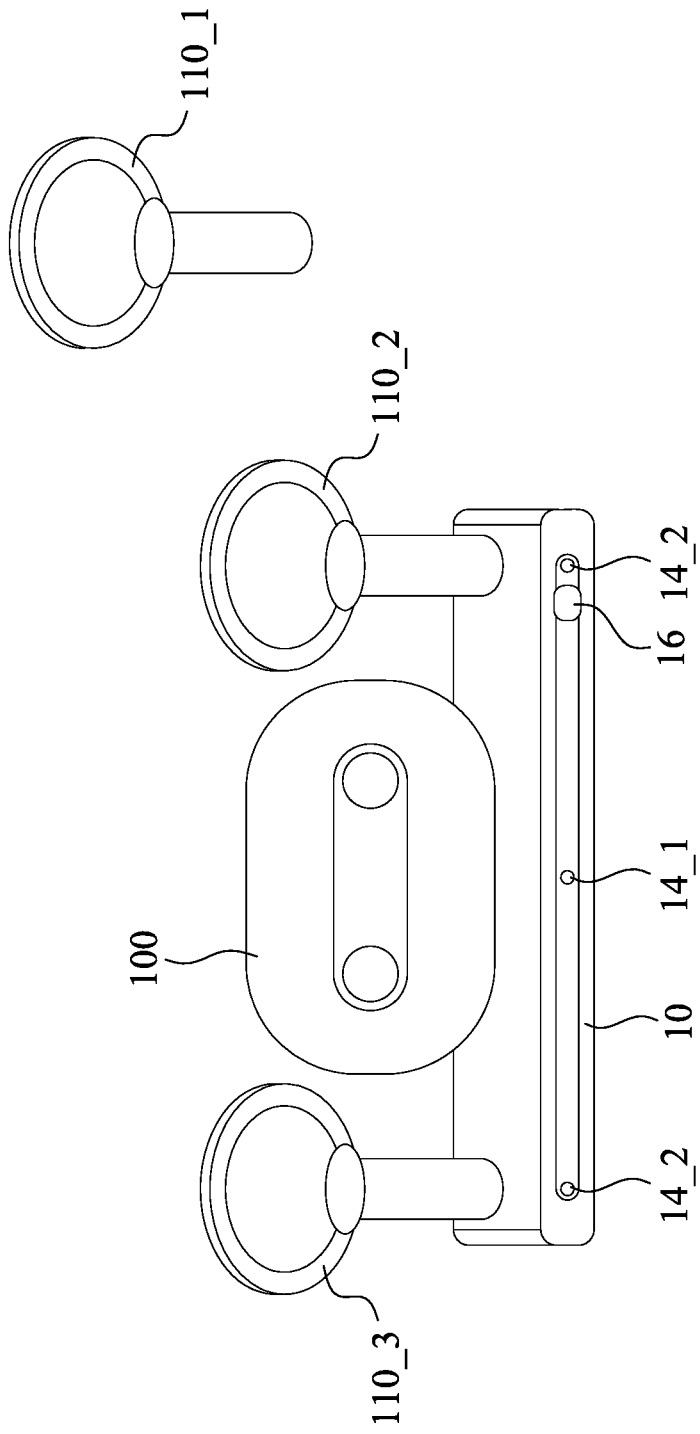
FIGS. 3A-3C are schematic diagrams of multiple communication devices and the device platform in accordance with some embodiments of the present disclosure.
Figure 3B:
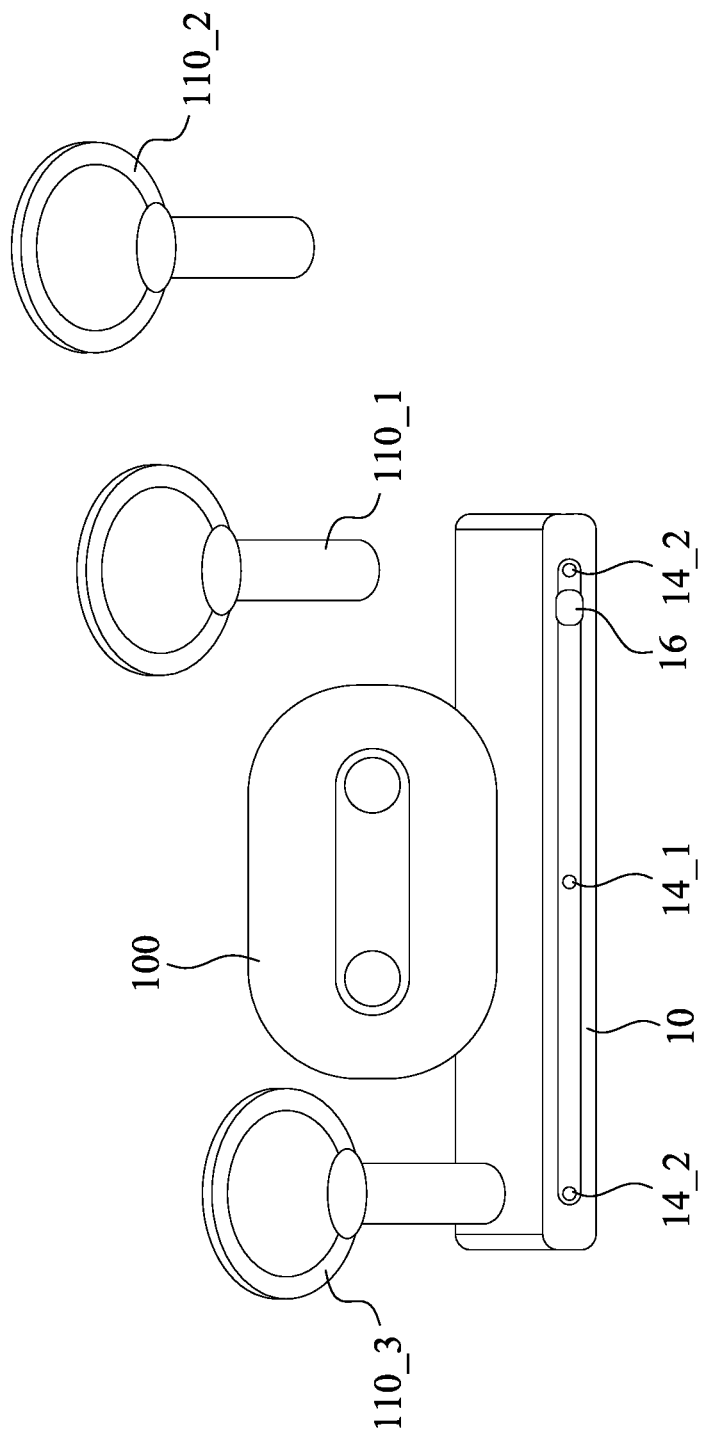
Figure 3C:
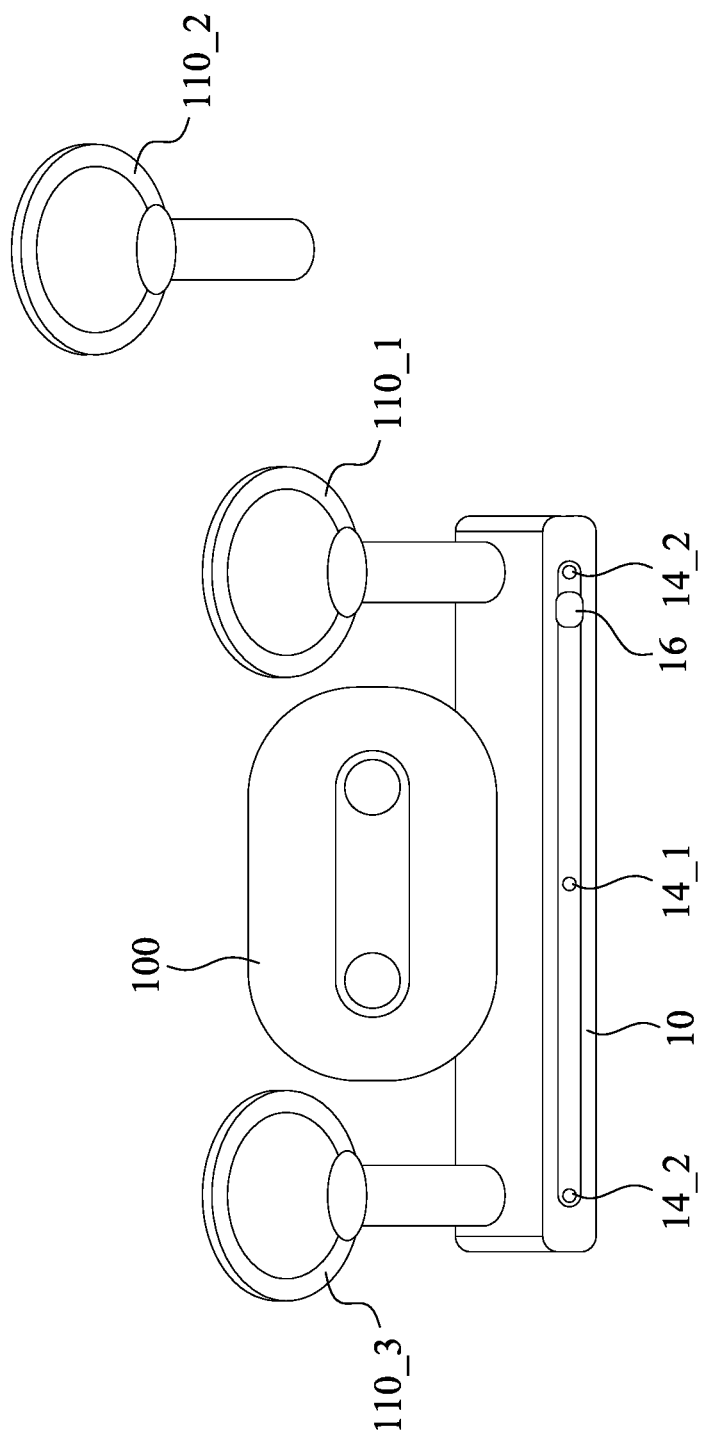

Referring to FIGS. 2A-2C, FIGS. 2A-2C depict the management method 200 in accordance with some embodiments of the present disclosure. The management method 200 can be performed by the processor 102 of the host device 100 as shown in FIG. 1, so that the host device 100 can wirelessly pair with at least one peripheral device 110 that is desired by the user. As shown in FIGS. 2A-2C, the management method 200 includes operations S201-S205, S211-S213 and S221-S224. Operations S201-S205, S211-S213 and S221-S224 would be described in detail below with reference to FIGS. 3A-3C. FIGS. 3A-3C depicts a host device 100, first, second and third peripheral devices 110_1-110_3 and a device platform 10 in accordance with some practical applications of the present disclosure. In some embodiments, the host device 100 of FIGS. 3A-3C can be implemented by the host device 100 of FIG. 1; the first, second and third peripheral devices 110_1-110_3 of FIGS. 3A-3C each can be implemented by the peripheral device 110 of FIG. 1; and the device platform 10 of FIGS. 3A-3C can be implemented by the device platform 10 of FIG. 1.

Referring to FIG. 3A, in some practical applications, the host device 100 is a head-mounted device (HMD) for displaying virtual reality (VR), augmented reality (AR) and/or mixed reality (MR). The first, second and third peripheral devices 110_1-110_3 each are controller for operating in the VR, AR, and/or MR environment. As shown in FIG. 3A, currently, the host device 100 and the second and third peripheral devices 110_2-110_3 are electrically connected to the device platform 10, and the first peripheral device 100_1 is not electrically connected to the device platform 10. It is assumed that the user desires to group the host device 100 and the first and third peripheral devices 110_1 and 110_3 together for pairing the host device 100 with both the first and third peripheral devices 110_1 and 110_3. Therefore, the user may disconnect the second peripheral device 110_2 from the device platform 10 (as shown in FIG. 3B), and then connects the first peripheral device 110_1 to the device platform 10 through the connect interface 14_2 (as shown in FIG. 3C). After the host device 100 and the first and third peripheral devices 110_1 and 110_3 are electrically connected to the device platform 10 (as shown in FIG. 3C), the processor 102 of the host device 100 performs operation S201.

As shown in FIG. 2A, in operation S201, the processor 102 detects the connection of the first peripheral device 110_1 through the device platform 10. In some embodiments, the processor 102 receives the resistance change generated when the connect interface 118 of the first peripheral device 110_1 is coupled to the connect interface 14_2 of the device platform 10, so as to detect the connection of the first peripheral device 110_1.

The processor 102 would perform operations S202-S204 if the input interface 16 of the device platform 10 receives the user input. In some embodiments, the input interface 16 is implemented by human machine interface, such as a push button (as shown in FIGS. 3A-3C), a touch panel or a toggle switch. In such way, the user can group multiple communication devices (i.e., the host device 100 and the first and third peripheral devices 110_1 and 110_3) that are electrically connected to the device platform 10 together by operating on the input interface 16, for example pressing the push button.

When the input interface 16 of the device platform 10 receives the user input (i.e., is operated by the user), the processing circuit 12 of the device platform 10 generates the control signal to the host device 100 through the connect interfaces 14_1, and to the first peripheral device 110_1 and the third peripheral device 110_3 through the connect interfaces 14_2 (as shown in FIG. 3C). Accordingly, the processor 102 receives the control signal from the device platform 10 through the connection between the connect interface 108 and the connect interface 14_1 in operation S202.

In response to the received control signal, the processor 102 receives the first device identifier provided by the first peripheral device 110_1 through the device platform 10 in operation S203. In some embodiments, the processor 112 of the first peripheral device 110_1 receives the control signal to output the first device identifier stored in the memory 114 to the device platform 10 through the connection between the connect interface 118 and the connect interface 14_2. Accordingly, the processor 102 receives the first device identifier provided by the first peripheral device 110_1 through the connection between the connect interface 108 and the connect interface 14_1.

Then, in operation S204, the processor 102 stores the first device identifier received from the device platform 10 in the memory 104. In some embodiments, before storing the first device identifier in the memory 104, the processor 102 first determines whether the first device identifier is stored in the memory 104 by, for example, comparing the first device identifier with each device identifier which is previously stored in the memory 104, and the processor 102 stores the first device identifier in the memory 104 if the first device identifier is not previously stored in the memory 104. In other embodiments, before storing the first device identifier in the memory 104, the processor 102 removes all device identifiers which are previously stored in the memory 104 first. The following paragraphs will discuss operations S221-223 that may be conducted in parallel with operations S201-S204, and operation S205 would be described after operations S221-223.

Referring to FIG. 2B, after the host device 100 and the first and third peripheral devices 110_1 and 110_3 are electrically connected to the device platform 10, the processor 102 further performs operation S221 (i.e., simultaneously with operation S201). In operation S221, the processor 102 detects the connection of the third peripheral device 110_3 through the device platform 10. Then, in operation S222, the processor 102 receives the control signal generated if the input interface 16 receives the user input through the device platform 10, similar to those discussed with respect to operation S202. In response to the received control signal, the processor 102 preserves the third device identifier provided by the third peripheral device 110_3 in the memory 104 in operation S223.

In the embodiment of FIG. 2B, the third device identifier is already stored in the memory 14 before the first peripheral device 110_1 is connected to the device platform 10. It can be appreciated that the processor 112 of the third peripheral device 110_3 also receives the control signal to output the third device identifier to the host device 100 through the device platform 10. Before preserving the third device identifier in the memory 104, the processor 102 determines that the third device identifier is already stored in the memory 104. For example, the processor 102 can compare the received third device identifier with each device identifier which is previously stored in the memory 104, so as to determine whether the third device identifier is already stored in the memory 104. The term preserving the third device identifier means discarding the received third device identifier, or does not replace or delete the third device identifier (e.g., by performing writing or erasing operation) stored in the memory 104 when the third device identifier is newly received. In some embodiments, if the processor 102 determines that the third peripheral device 110_3 maintains electrically connection to the device platform 10 after the previous third device identifier is received, the processor 102 may preserve the third device identifier without comparing the received third device identifier with device identifiers stored in the memory 104 (i.e., directly discarding the received third device identifier). In other embodiments, the processor 102 removes all device identifiers (including the third device identifier) which are previously stored in the memory 104 and then stores the received third device identifier in the memory 104.

After operations S204 and S223 are performed, the first and third device identifiers are stored in the memory 104 of the host device 100 (i.e., the host device 100, the first peripheral device 110_1 and the third peripheral device 110_3 are grouped together). Accordingly, operations S205 and S224 can be performed by the processor 102. As shown in FIG. 2A, in operation S205, the processor 102 wirelessly pairs the host device 100 with the first peripheral device 110_1 through the communication circuit 106 according to the first device identifier stored in the memory 104, to enable the wireless communication between the host device 100 and the first peripheral device 110_1. As shown in FIG. 2B, in operation S224, the processor 102 wirelessly pairs the host device 100 with the third peripheral device 110_3 through the communication circuit 106 according to the third device identifier stored in the memory 104, to enable the wireless communication between the host device 100 and the third peripheral device 110_3.

In some embodiments, operations S205 and S224 are performed after the host device 100 is disconnected from the device platform 10.

In other embodiments that the input interface 16 is omitted, operation S202 (as shown in FIG. 2A) and operation S222 (as shown in FIG. 2B) are omitted. Instead of operations S202 and S222, after the connection of at least one new peripheral device (e.g., the first peripheral device 110_1) to the device platform 10 is detected by the processor 102 of the host device 100, the processor 102 of the host device 100 send requests to all peripheral devices (e.g., the first and third peripheral devices 110_1 and 110_3) connected to the device platform 10 through the device platform 10, thereby receiving the corresponding device identifiers provided by all peripheral devices connected to the device platform 10. The description of other operations in FIGS. 2A and 2B is similar to those of the above-described embodiments and therefore is omitted herein.

Referring to FIG. 2C, after the second peripheral device 110_2 is disconnected from the device platform 10 (as shown in FIG. 3B), the processor 102 of the host device 100 performs operation S211. In operation S211, the processor 102 detects the disconnection of the second peripheral device 110_2 through the device platform 10. In some embodiments, the processor 102 receives the resistance change generated when the connect interface 118 of the second peripheral device 110_2 is uncoupled from the connect interface 14_2 of the device platform 10, so as to detect the disconnection of the second peripheral device 110_2.

The processor 102 would perform operations S212-S213 if the input interface 16 of the device platform 10 receives the user input. In operation S212, the processor 102 receives the control signal generated if the input interface 16 receives the user input through the device platform 10. In response to the received control signal, the processor 102 removes the second device identifier, which is previously provided by the second peripheral device 110_2 through the device platform 10, from the memory 104. Comparing with some embodiments aforementioned, the processor 102 needs not to remove all of the device identifiers in the memory 104 when receiving the control signal, the processor 102 may only remove the device identifier of the peripheral device that is connected with the device platform 10 before the control signal is generated and removed after the generation of the control signal. Accordingly, by replacing the second peripheral device 110_2 with the first peripheral device 110_1 as shown in FIGS. 3A-3C, the user can adjust the combination of desired peripheral devices.

In the embodiment of FIG. 2C, the second device identifier is already stored in the memory 14 before the second peripheral device 110_2 is disconnected from the device platform 10. It can be appreciated that each peripheral device (e.g., the first peripheral devices 110_1 and the third peripheral device 110_3) connected to the device platform 10 also receives the control signal to output the corresponding device identifier (e.g., the first device identifier and the third device identifier) to the host device 100 through the device platform 10. Before removing the second device identifier in the memory 104, the processor 102 first determines that the second device identifier stored in the memory 104 is different from all received device identifiers. For example, the processor 102 can compare the second device identifier with each device identifier which is newly received from the device platform 10. The remove of the second device identifier from the memory 104 would ensure that the second peripheral device 110_2 disconnected from the device platform 10 won't be thereafter erroneously paired with the host device 100, or ensure a disconnection of a wireless communication between the host device 100 and the second peripheral device 110_2 which is established before the host device 100 is coupled to the device platform 10. In other embodiments, the processor 102 removes all device identifiers (including the second device identifier) which are previously stored in the memory 104, and then the processor 102 receives the corresponding device identifiers provided by all peripheral devices connected to the device platform 10.

In other embodiments that the input interface 16 is omitted, operation S212 is omitted. In such arrangement, the processor 102 of the host device 100 removes the second device identifier provided by the second peripheral device 110_2 from the memory 104 in operation S213 in detecting that at least one peripheral device (e.g., the first peripheral device 110_1) is newly connected to the device platform 10. The description of other operations in FIG. 2C is similar to those of the above-described embodiments and therefore is omitted herein.

Figure 4A:
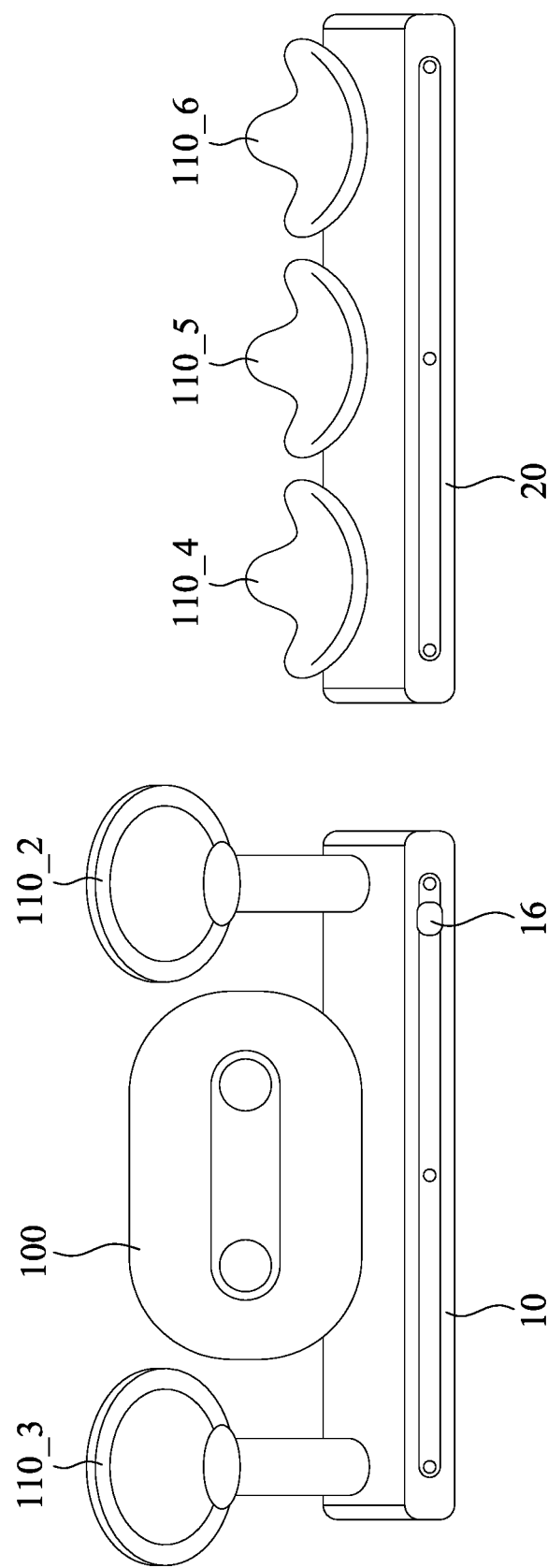
FIGS. 4A-4C are schematic diagrams of multiple communication devices and multiple device platforms in accordance with some embodiments of the present disclosure.
Figure 4B:
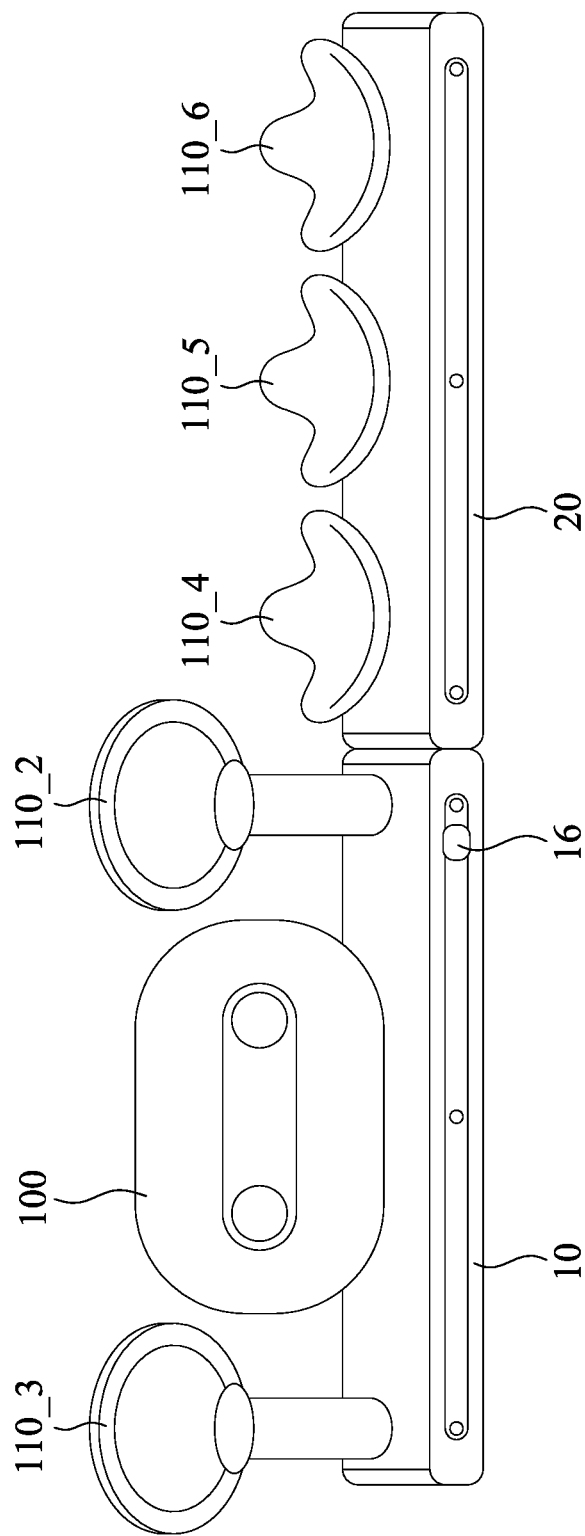
Figure 4C:
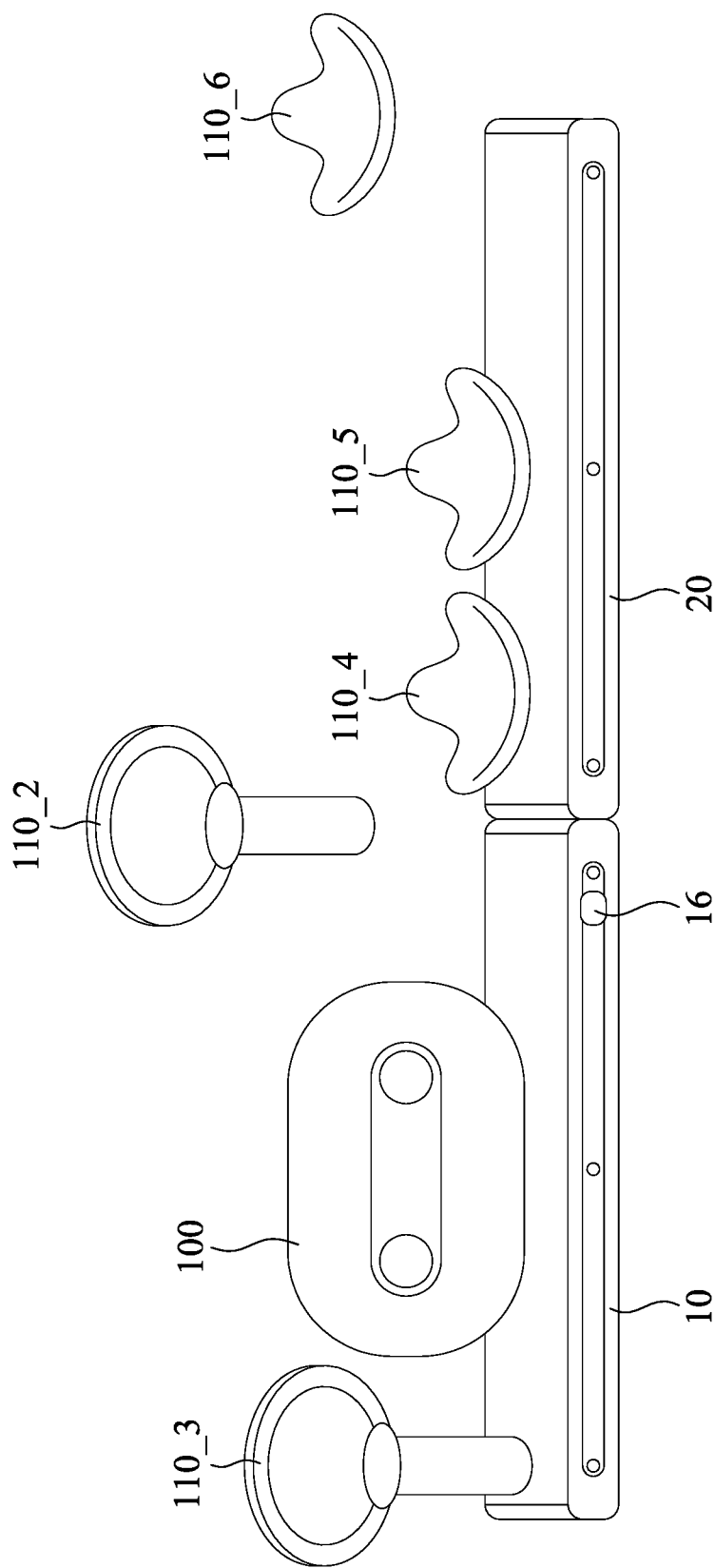

Referring to FIGS. 4A-4C, FIGS. 4A-4C depict the host device 100, the second, third, fourth, fifth and sixth peripheral devices 110_2-110_6 and the device platforms 10 and 20 in accordance with some practical applications of the present disclosure. In some practical applications, each of the fourth, fifth and sixth peripheral devices 110_4-110_6 is a tracker for tracking the action of user in the VR environment or the hand-held controller as discussed above. As shown in FIG. 4A, the fourth, fifth and sixth peripheral devices 110_4-110_6 are electrically connected to the device platform 20. It can be appreciated that the device platform 20 can be implemented by the device platform 10 of FIG. 1 and that the fourth, fifth and sixth peripheral devices 110_4-110_6 can be implemented by the peripheral device 110 of FIG. 1. Therefore, the fourth, fifth and sixth peripheral devices 110_4-110_6 can be charged through the device platform 20. The host device 100 and the second and third peripheral devices 110_2-110_3 are electrically connected to the device platform 10 by, for example, coupling the connect interface 108 to the connect interface 14_1 and coupling the connect interface 118 to the connect interface 14_2, respectively.

As shown in FIG. 4B, the device platform 20 is then electrically connected to the device platform 10 wirelessly (for example, through NFC, RFID, Bluetooth or ZigBee technology) or wired (for example, through USB type-C transmission interface) for data communication and power supplying. In such arrangement, the electric power generated by the power supplying source is provided to the device platform 20 through the device platform 10 (or is provided to the device platform 20 directly), so that the fourth, fifth and sixth peripheral devices 110_4-110_6 can be charged through the device platform 20. In addition, the processor 102 of the host device 100 can detect the connection of the second and third peripheral devices 110_2-110_3 through the device platform 10, and can also detect the connection of the fourth, fifth and sixth peripheral devices 110_4-110_6 through the device platforms 10 and 20.

As discussed above, the method 200 allows the user to adjust the combination of the desired peripheral devices to be paired with the host device 100. In the situation that the user desires to group the host device 100 and the third, fourth and fifth peripheral devices 110_3-110_5 together for pairing the host device 100 with the third, fourth and fifth peripheral devices 110_3-110_5, the user may remove the second and sixth peripheral devices 110_2 and 110_6 from the device platforms 10 and 20 and then conduct the method 200 to the host device 100 and the third, fourth and fifth peripheral devices 110_3-110_5, as shown in FIG. 4C. After the input interface 16 on the device platform 10 receives the user input, the third peripheral device 110_3 outputs the third device identifier to the device platform 10, and the fourth and fifth peripheral devices 110_4-110_5 output the fourth and fifth device identifiers to the device platform 20 to further transmit to the device platform 10 through wired interface (e.g., USB type-C transmission interface) or wireless interface (e.g., NFC, RFID, Bluetooth or ZigBee interface). The processor 102 of the host device 100 receives the third, fourth and fifth device identifiers through the device platform 10, so as to store and/or preserve the third, fourth and fifth device identifiers in the memory 104 of the host device 100.

In some embodiments, before storing and/or preserving the third, fourth and fifth device identifiers in the memory 104, the processor 102 compares each of the third, fourth and fifth device identifiers with all device identifiers which are previously stored in the memory 104. For example, the second and third device identifiers are previously stored in the memory 104. After comparing, the processor 102 determines that the second device identifier is different from all received device identifiers, that the received third device identifier is the same as the third device identifier already stored in the memory 104 and that the fourth and fifth device identifiers are not stored in the memory 104 yet. Therefore, the processor 102 would remove the second device identifier from the memory 104, preserve the third device identifier in the memory 104 and store the fourth and fifth device identifiers in the memory 104. In other embodiments, after the input interface 16 on the device platform 10 receives the user input, the processor 102 removes all device identifiers which are previously stored in the memory 104, and thus all the received device identifiers are stored in the memory 104 and the comparison operation is omitted.

In some embodiments, after the third, fourth and fifth device identifiers are stored in the memory 104, the processor 102 wirelessly pairs the host device 100 with the third, fourth and fifth peripheral devices 110_3-110_5 through the communication circuit 106 according to the third, fourth and fifth device identifiers stored in the memory 104, so as to enable the wireless communications between the host device 100 and each of the third, fourth and fifth peripheral devices 110_3-110_5. In other embodiments, the processor 102 pairs the host device 100 with the third, fourth and fifth peripheral devices 110_3-110_5 when the host device 100 is disconnected from the device platform 10.

In sum, by coupling at least one peripheral device 110 to at least one device platform 10 to which the host device 100 is already connected (or uncoupling at least one peripheral device from at least one device platform), the device combination desired by the user can be established. In addition, the host device 100 and at least one peripheral device 110 can be charged through at least one device platform 10. In such way, when the user wants to operate in the VR environment through the desired device combination, the host device 100 can pair with at least one peripheral device 110 which is connected to at least one device platform 10 rapidly and efficiently.

Furthermore, in the scenario that multiple sets of communication devices (e.g., multiple sets of VR equipment (each set might include HMD, hand-held controllers, trackers and lighthouses)) are provided for multiple users (e.g., students in classroom), the present disclosure allows each user to rapidly grip and pair the combination of desired communication devices (e.g., one HMD and two hand-held controllers) through the device platform without recognizing the desired communication devices among other communication devices by, for example, the sticker with number and/or color on the communication device, the outer shell of the communication device with color, etc. Therefore, the time for the users to get the combination of desired communication devices can be dramatically saved.

The disclosed methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A management method for multiple communication devices, wherein the multiple communication devices comprise a host device and a first peripheral device configured to electrically connect to a device platform, and the management method comprises:

by the host device, detecting a connection of the first peripheral device through the device platform;

by the host device, receiving a first device identifier provided by the first peripheral device through the device platform;

by the host device, storing the first device identifier in the host device; and in response to the host device being disconnected from the device platform, by the host device, wirelessly pairing the host device with the first peripheral device, according to the first device identifier stored in the host device, to enable a first wireless communication between the host device and the first peripheral device;

wherein the multiple communication devices further comprises a fourth peripheral device, and if the fourth peripheral device is electrically connected to another device platform and the another device platform is electrically connected to the device platform to which the host device is connected, the management method further comprises:

by the host device, detecting the connection of the fourth peripheral device through the device platform and the another device platform;

by the host device, receiving a fourth device identifier provided by the fourth peripheral device through the device platform and the another device platform;

by the host device, storing the fourth device identifier in the host device; and in response to the host device being disconnected from the device platform, by the host device, wirelessly pairing the host device with the fourth peripheral device, according to the fourth device identifier stored in the host device, to enable a fourth wireless communication between the host device and the fourth peripheral device.

2. The management method of claim 1, wherein the operation of storing the first device identifier comprising:

by the host device, determining whether the first device identifier is stored in the host device; and by the host device, if determining that the first device identifier is not stored in the host device, storing the first device identifier received through the device platform in the host device.

3. The management method of claim 1, wherein before the operation of storing the first device identifier, the management method further comprises:

by the host device, removing all device identifiers that are previously stored in the host device.

4. The management method of claim 1, wherein the device platform comprises an input interface and is configured to generate a control signal in response to a reception of a user input through the input interface, the first peripheral device outputs the first device identifier to the device platform in response to a reception by the first peripheral device of the control signal, and the host device stores the first device identifier received through the device platform in response to a reception by the host device of the control signal.

5. The management method of claim 1, wherein the multiple communication devices further comprise a second peripheral device configured to electrically connect to the device platform and provide a second device identifier, and if the second peripheral device is previously connected to the device platform with the host device and the host device detects a disconnection of the second peripheral device from the device platform, the management method further comprises:

by the host device, removing the second device identifier from the host device if the second device identifier is stored in the host device.

6. The management method of claim 5, wherein the device platform comprises an input interface and is configured to generate a control signal in response to a reception of a user input through the input interface, and the host device removes the second device identifier in response to the disconnection of the second peripheral device from the device platform and to a reception by the host device of the control signal.

7. The management method of claim 1, wherein the multiple communication devices further comprise a third peripheral device configured to electrically connect to the device platform and provide a third device identifier, and if the third peripheral device is electrically connected to the device platform before the connection of the first peripheral device is detected, the management method further comprises:

by the host device, preserving the third device identifier stored in the host device if the host device newly receives the third device identifier through the device platform; and by the host device, wirelessly pairing the host device with the third peripheral device, according to the third device identifier stored in the host device, to enable a third wireless communication between the host device and the third peripheral device.

8. The management method of claim 7, wherein the device platform comprises an input interface and is configured to generate a control signal in response to a reception of a user input through the input interface, the first peripheral device outputs the first device identifier to the device platform in response to a reception by the first peripheral device of the control signal, the host device stores the first device identifier received through the device platform in response to a reception by the host device of the control signal, and the host device preserves the third device identifier in response to the reception by the host device of the control signal.

9. The management method of claim 1, wherein the device platform or the another device platform comprises an input interface and is configured to generate a control signal in response to a reception of a user input through the input interface, the fourth peripheral device outputs the fourth device identifier to the another device platform in response to a reception by the fourth peripheral device of the control signal, and the host device stores the fourth device identifier received through the device platform in response to a reception by the host device of the control signal.

10. A host device, configured to be electrically connected to a device platform, and comprising:

a memory;

a communication circuit; and a processor coupled to the memory and the communication circuit and configured to:

detect a connection of a first peripheral device to the device platform through the device platform;

receive a first device identifier provided by the first peripheral device through the device platform;

store the first device identifier in the memory; and in response to the host device being disconnected from the device platform, wirelessly pair the host device with the first peripheral device through the communication circuit, according to the first device identifier stored in the memory, to enable a first wireless communication between the host device and the first peripheral device;

wherein if a fourth peripheral device is electrically connected to another device platform and the another device platform is electrically connected to the device platform to which the host device is connected, the processor is further configured to:

detect the connection of the fourth peripheral device through the device platform and the another device platform;

receive a fourth device identifier provided by the fourth peripheral device through the device platform and the another device platform;

store the fourth device identifier in the memory; and in response to the host device being disconnected from the device platform, wirelessly pair the host device with the fourth peripheral device through the communication circuit, according to the fourth device identifier stored in the memory, to enable a fourth wireless communication between the host device and the fourth peripheral device.

11. The host device of claim 10, wherein before storing the first device identifier, the processor is further configured to remove all device identifiers that are previously stored in the memory.

12. The host device of claim 10, wherein the device platform comprises an input interface and is configured to generate a control signal in response to a reception of a user input through the input interface, the first peripheral device outputs the first device identifier to the device platform in response to a reception by the first peripheral device of the control signal, and the processor stores the first device identifier received through the device platform in response to a reception by the host device of the control signal.

13. The host device of claim 10, wherein a second peripheral device is configured to electrically connect to the device platform and provide a second device identifier, and if the second peripheral device is previously connected to the device platform with the host device and the processor detects a disconnection of the second peripheral device from the device platform, the processor is further configured to:
  remove the second device identifier from the memory if the second device identifier is stored in the memory.

14. The host device of claim 13, wherein the device platform comprises an input interface and is configured to generate a control signal in response to a reception of a user input through the input interface, and the processor removes the second device identifier in response to the disconnection of the second peripheral device from the device platform and to a reception by the processor of the control signal.

15. The host device of claim 10, wherein a third peripheral device is configured to electrically connect to the device platform and provide a third device identifier, and
  if the third peripheral device is electrically connected to the device platform before the connection of the first peripheral device is detected, the processor is further configured to:
  preserve the third device identifier stored in the memory if newly receiving the third device identifier through the device platform; and
  wirelessly pair the host device with the third peripheral device through the communication circuit, according to the third device identifier stored in the memory, to enable a third wireless communication between the host device and the third peripheral device.

16. The host device of claim 15, wherein the device platform comprises an input interface and is configured to generate a control signal in response to a reception of a user input through the input interface, the first peripheral device outputs the first device identifier to the device platform in response to a reception by the first peripheral device of the control signal, the processor stores the first device identifier received through the device platform in response to a reception by the processor of the control signal, and the processor preserves the third device identifier in response to the reception by the processor of the control signal.

17. The host device of claim 10, wherein the device platform or the another device platform comprises an input interface and is configured to generate a control signal in response to a reception of a user input through the input interface, the fourth peripheral device outputs the fourth device identifier to the another device platform in response to a reception by the fourth peripheral device of the control signal, and the processor receives the fourth device identifier received through the device platform in response to a reception by the processor of the control signal.

18. A non-transitory computer readable storage medium with a computer program to execute a management method for multiple communication devices, wherein the multiple communication devices comprise a host device and a first peripheral device configured to electrically connect to a device platform, and the management method comprises:
  by the host device, detecting a connection of the first peripheral device through the device platform;
  by the host device, receiving a first device identifier provided by the first peripheral device through the device platform;
  by the host device, storing the first device identifier in the host device; and
  in response to the host device being disconnected from the device platform, by the host device, wirelessly pairing the host device with the first peripheral device, according to the first device identifier stored in the host device, to enable a first wireless communication between the host device and the first peripheral device;
  wherein the multiple communication devices further comprises a fourth peripheral device, and if the fourth peripheral device is electrically connected to another device platform and the another device platform is electrically connected to the device platform to which the host device is connected, the management method further comprises:
  by the host device, detecting the connection of the fourth peripheral device through the device platform and the another device platform;
  by the host device, receiving a fourth device identifier provided by the fourth peripheral device through the device platform and the another device platform;
  by the host device, storing the fourth device identifier in the host device; and
  in response to the host device being disconnected from the device platform, by the host device, wirelessly pairing the host device with the fourth peripheral device, according to the fourth device identifier stored in the host device, to enable a fourth wireless communication between the host device and the fourth peripheral device.

* * * * *